United States Patent
Stafset

(10) Patent No.: US 7,513,970 B2
(45) Date of Patent: Apr. 7, 2009

(54) METHOD AND APPARATUS FOR PRODUCTION OF A REINFORCEMENT BAR

(75) Inventor: Kare Stafset, Alesund (NO)

(73) Assignee: Spilka International AS, Alesund (NO)

( * ) Notice: Subject to any disclaimer, the term of this patent is extended or adjusted under 35 U.S.C. 154(b) by 486 days.

(21) Appl. No.: 10/562,917

(22) PCT Filed: Jun. 23, 2004

(86) PCT No.: PCT/NO2004/000185

§ 371 (c)(1), (2), (4) Date: Dec. 23, 2005

(87) PCT Pub. No.: WO2004/113638

PCT Pub. Date: Dec. 29, 2004

(65) Prior Publication Data

US 2006/0159919 A1    Jul. 20, 2006

(30) Foreign Application Priority Data

Jun. 23, 2003  (NO) ................................ 20032874

(51) Int. Cl.
*B65H 81/00* (2006.01)
*B32B 37/00* (2006.01)

(52) U.S. Cl. ................. 156/174; 156/169; 156/425; 156/433; 156/441

(58) Field of Classification Search ................ 156/173, 156/174, 175, 169, 425, 433, 441, 250, 510
See application file for complete search history.

(56) References Cited

U.S. PATENT DOCUMENTS

| 2,980,158 | A | * | 4/1961 | Meyer .................. 156/175 |
| 3,057,767 | A | * | 10/1962 | Kaplan .................. 156/172 |
| 3,111,569 | A | * | 11/1963 | Rubenstein .............. 52/223.14 |
| 4,296,060 | A | | 10/1981 | Killmeyer et al. |
| 4,620,401 | A | | 11/1986 | L'Esperance et al. |
| 4,659,071 | A | * | 4/1987 | Woltron .................... 267/149 |
| 5,727,357 | A | | 3/1998 | Arumugasaamy et al. |
| 5,924,262 | A | | 7/1999 | Fawley |
| 5,981,630 | A | | 11/1999 | Banthia et al. |

FOREIGN PATENT DOCUMENTS

| EP | 0308237 | 3/1989 |
| EP | 0367187 | 5/1990 |

\* cited by examiner

*Primary Examiner*—Jeff H Aftergut
(74) *Attorney, Agent, or Firm*—Ableman, Frayne & Schwab

(57) ABSTRACT

A method for fabrication of a bent reinforcing rod in a composite material is described, where the reinforcing rod is composed of longitudinal fibers and a sheathing layer of fibers or foil, comprising the steps: to moisten fiber thread with a binding agent, to reel the moistened fiber thread to a bundle with a closed, approximately circular shape, consisting of a layer of longitudinal, parallel fibers of a desired thickness, whereby all the fibers in the layer obtain an approximately equal axial tightening, and to envelope an outer layer of fiber threads, and/or foil, or other suitable material, around the layer of longitudinal fibers, and that the fabricated blank is given a final form in a second forming process. The invention also relates to a device (10) for carrying out the method.

15 Claims, 2 Drawing Sheets

METHOD AND APPARATUS FOR PRODUCTION OF A REINFORCEMENT BAR

CROSS-REFERENCE TO RELATED APPLICATIONS

This application is a national stage application under 35 U.S.C. 371 of PCT/NO2004/000185, filed on Jun. 23, 2004.

The present invention relates to a method and a device for fabrication of a reinforcing rod in a composite material, where the reinforcing rod is composed of longitudinal fibres and a sheathing layer of fibres and/or foil, or other suitable material.

In particular, the present invention relates to composite rods in a bent configuration for use in concrete, among other things. Such bends have a limited size, and normally have a U-shape, an angle shape or a combination of these. The designation for such bent rods is loops. A problem with known composite rods is that tension differences arise in the bent areas. This is due to different tightening of the fibre threads in the bent areas. In the bending of the known rods, the outer fibre threads will thereby be stretched more than the inner fibre threads. The challenge is therefore to fabricate a composite rod where the fibre threads have an approximate even tightening in the inner part of the loop as well as in the outer part, i.e. in the bent parts also. This is very important for the strength of the composite rod.

From known technology, U.S. Pat. No. 5,981,630 shall be mentioned among others. This document concerns sine-formed small fibres for mixing in with the concrete. U.S. Pat. No. 4,620,401 relates to winding of an ordinary composite rod for establishing an anchorage in the concrete with a loop, that is produced by winding on a body, and cured. EP 0308237 concerns a production process for straight rods, but with different cross-sections that are established by fabrication of a rod with a circular cross-section. Of these documents, this is closest to the present invention, namely in that the profile is formed in an uncured condition. However, it is difficult to obtain even tightening in the fibres after forming in the rectangular, L, H or I cross-section as shown in the document. Besides, EP 0308237 relates only to cross-section forming of straight rods, and not loops as with the present invention.

Whatever the desired shape of a loop, it can be fabricated in a whole, closed form. A circular blank can thereby be used to be formed into a desired shape. If the final product shall not have a closed shape, two or more products can be combined and after the shape has been completed and cured, it can be divided. If an angle shape only is wanted, two or four angles can be combined to a square shape that has a closed form. Thereafter, it can be cut at two corners to make two angle loops, or at the sides to make four angle loops. If a U-shape is wanted, one can do the same, i.e. make a complete square and divide it into two afterwards.

A circular blank, for example, where cured plastic covered fibres are reeled into a bundle on a holding device, where the fibres are equally tight, will have the shorter fibres nearest the centre and the longer on the outside. In subsequent shaping of the circular blank into any shape, i.e. in one and the same plane, one achieves that all the fibres are equally tight. The assumption is that the fibres glide axially in relation to each other during the shaping to adapt to the forming locally.

The object of the present invention is to provide a bent reinforcement rod in a composite material that does not have the abovementioned disadvantages and which has equally tight fibres in the bent sections as in the rest of the rod. Thereby, one achieves that whatever the shape the composite material is bent into, the fibres will lie approximately in parallel.

The object is achieved with a method of moistening fibre thread with a binding agent, to reel the moistened fibre thread into a bundle with a closed, approximately circular shape, comprising a layer of longitudinal, parallel fibres of the desired thickness, whereby all the fibres in the layer get approximately equal axial tightening, and to envelope an outer layer of fibre threads and/or foil, or other suitable material, around the layer of longitudinal fibres, whereupon the fabricated blank is given a final shape in a second forming process.

In alternative embodiments of the method the enveloping can comprise winding, by a method in itself known, an outer layer of fibres threads, and/or foil/band, in a helically form around the layer of longitudinal fibres, or the enveloping can comprise knitting, by a method in itself known, an outer layer of fibre threads, and/or foil/bank, around the layer of longitudinal fibres. The moistened fibre thread can be wound into a bundle by reeling of the fibre thread onto a rotational plate with a number of holding means for fibre thread, to the approximately circular form. The final shape of the reeled bundle is preferably obtained by tightening in a gig to the desired form, and by the subsequent heating to the curing temperature for the binding agent, whereupon the finally formed blank can be divided. It is preferred that the used fibre thread is selected from a group comprising glass, basalt, carbon, thermoplastic or the like, and cured plastic is utilised as the binding agent.

The invention also relates to a device for carrying out the method according to the invention, and is characterised by a device for reeling and winding of fibre threads for use in reinforcing rods of a composite material, with a rotational plate comprising a number of holding means for Fibre thread, where the holding means are arranged at a mutual distance apart adjacent to the outer edge of the plate, for reeling of an approximately circular blank with longitudinal fibre threads.

Alternate embodiments of the device are characterised in that the holding means are wheels encompassing suitable grooves for the fibre threads, and that the device comprises a winding appliance arranged for winding fibre thread, and/or foil, or other material, in a helically form around the longitudinal fibre threads, or that the device comprises at least one knitting appliance arranged to knit fibre thread and/or foil, or other suitable material, around the longitudinal fibre threads. The device can also comprise a tightening system arranged to tighten and to regulate the supply of fibre thread to the holding means of the rotational plate.

The invention shall now be described in more detail with the help of the enclosed figures, in which.

The principle of the present invention is that moistened fibres are arranged in a circular bundle. These are kept in a bundle form with the help of a sheathing of wound or knitted material, fibres, foil, band or the like, suitable for keeping together the fibres in the circular bundle. The material being wound round can also be selected with regard to the surface of the final product, as a surface well suited to achieving a good grip between the reinforcing (the loop) and the concrete. The bundle is preferably circular to achieve an even tightening in all fibres after the bundle has got its final shape and is to be cured.

In forming of the pre-produced loop (bundle) in a final shape, the fibres will glide longitudinally with respect to each other to adapt to the shape the loop will be given, but this is locally and the final tightening will be equal for the inner and outer fibres, as long as the finished loop has a continuous, closed form in one plane.

The advantage with this production process is that one does not need any special form where the loop is produced and cured. It can be made ready in blanks, which then are formed in simple gigs and are cured. It is only required that the blank must be of about the right length (circumference) and that the cross-section is right (material diameter). The shape is decided by the tightening jig in the curing only. This final shape and the curing can take place over days to weeks after the blank is produced.

Furthermore, it shall be mentioned that another form for sheathing of the fibre threads other than coiling can be used also. For example, the fibre threads can be knitted by crocheting or sewing, or the like. The advantage of knitting rather than coiling is that the fibre bundle is not stressed by a moment corresponding to that during the coiling.

Figure 1:
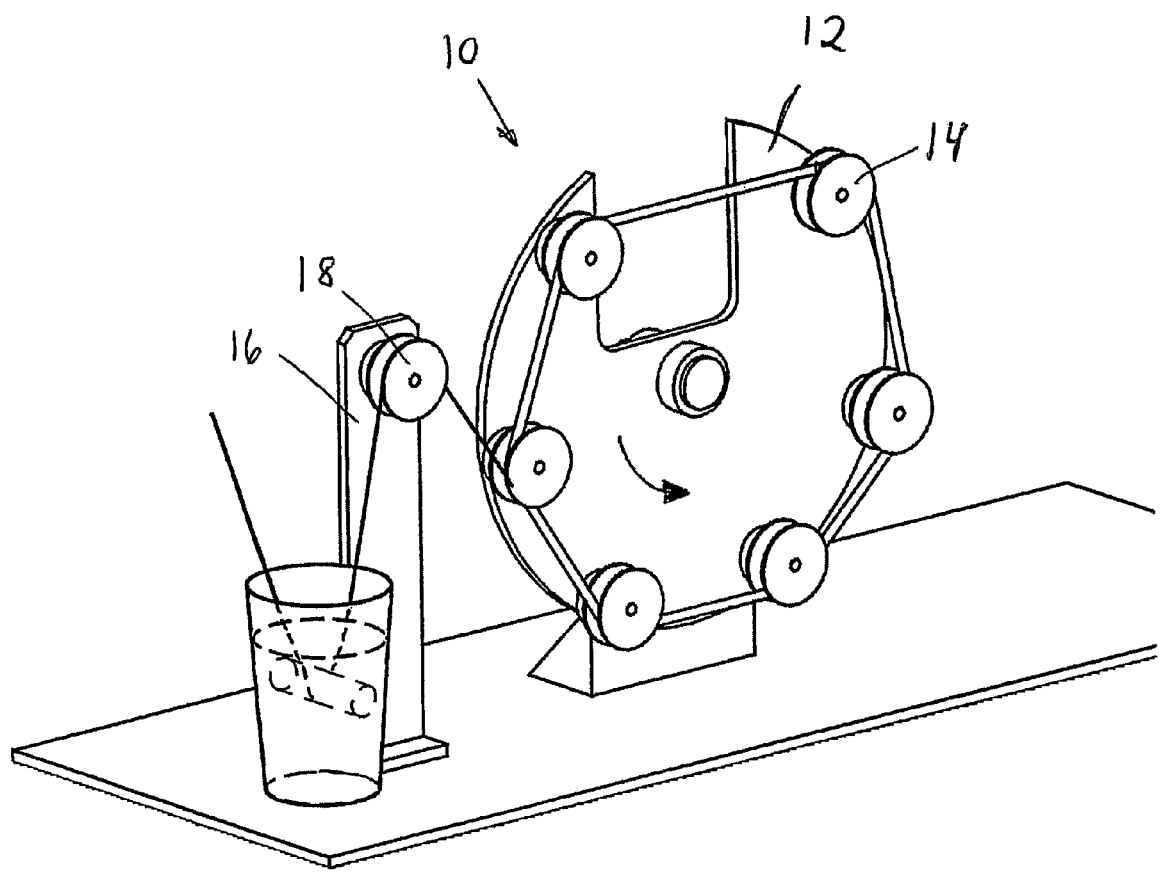
FIG. 1 shows an embodiment of a device, according to the invention, for reeling of fibre threads.
Figure 2:
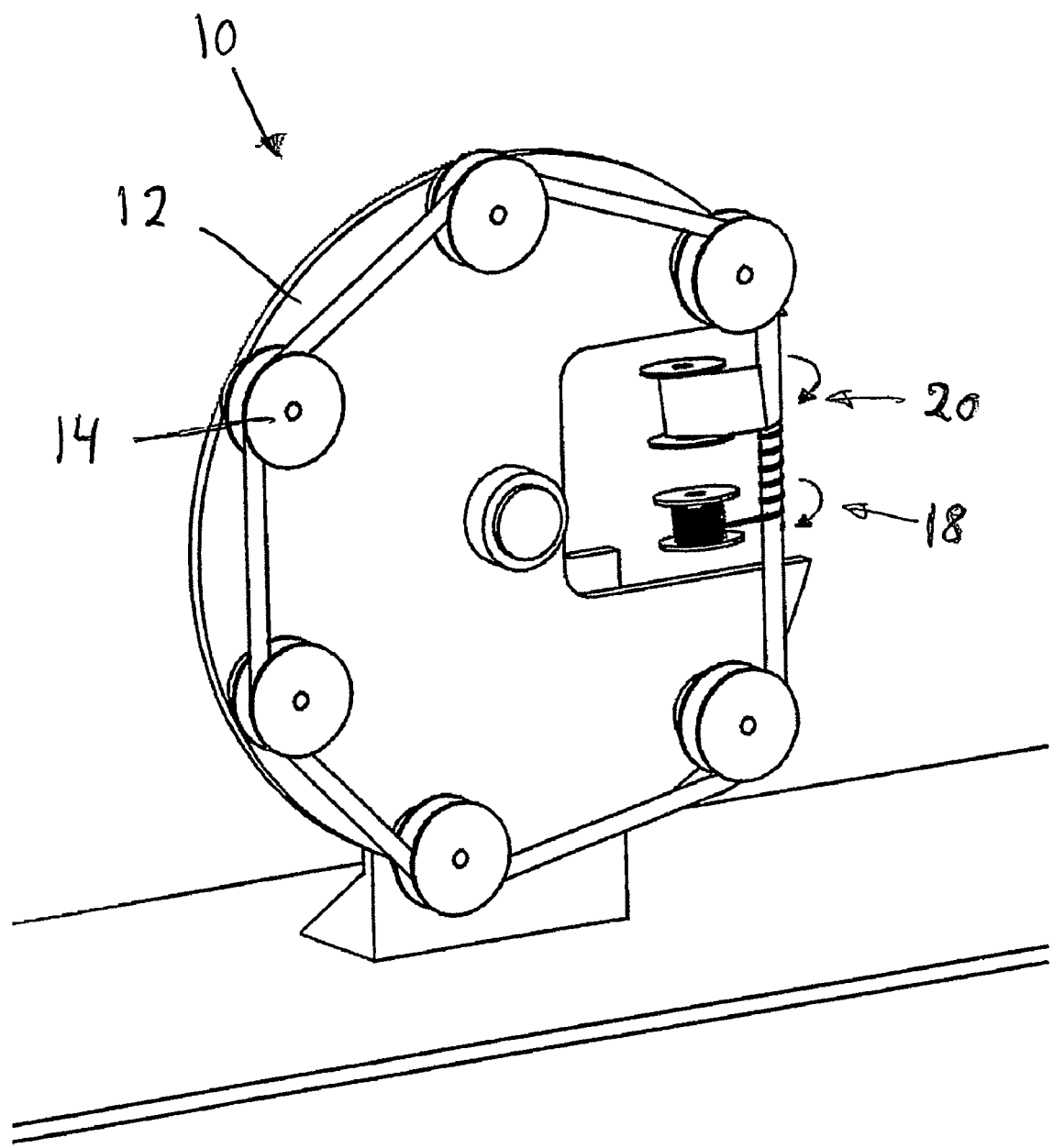
FIG. 2 shows a winding process of helically coiling of an outer layer of fibre threads and/or foil.

FIGS. 1 and 2 show a device for fabrication of blanks of composite material which shall be formed to reinforcing loops to be used in, for example, concrete. As shown, the device 10 comprises a rotational plate-like part 12 comprising a number of holding means 14 for the fibre threads. The holding means can be shaped as wheels with suitable grooves for the fibre threads. The wheels can, if required, be rotary. The rotational plate 12 rotates with the help of a driving appliance, such as a standard electromotor or the like.

The fibre threads are reeled to a bundle in that the plate-like part rotates. Control of the tightening in the fibre threads can be obtained by a tightening appliance 16, arranged adjacent to the plate-like part 12. The tightening appliance can comprise a wheel 18 which also regulates the application of the fibre thread, and the wheel can alternatively be spring-loaded to further regulate the tightening in the fibre thread.

Prior to the reeling of the fibre thread, a binding agent is applied to it, preferably in the form of a thermoset plastic, by the fibre thread being led through the binding agent or brought into contact with the binding agent in another way.

After the longitudinal, parallel fibre threads are reeled into a bundle, they can be held together by helically winding of an outer fibre thread, and/or a foil, or other suitable material, with the help of one or more winding appliances 18, 20 for fibre thread and foil/band, respectively.

In an alternative embodiment of the device according to the invention (not shown), the longitudinal, parallel fibre threads, after being reeled into a bundle, can be held together by an outer fibre thread, and/or a foil, or other suitable material, being knitted on with the help of one or more knitting appliances for fibre thread and foil/band, respectively.

Thermoset plastic is initially applied as a binding agent, but it is also possible to use thermoplastic as a binding agent. The process will be the same, while the working operations reeling/winding and final forming must necessarily take place at a temperature where the thermoplastic is liquid to a sufficient extent. The curing itself will then be unnecessary, only cooling must be carried out.

The invention claimed is:

1. A method for fabrication of a reinforcing blank from a composite material, wherein the reinforcing blank is fabricated of longitudinal fibres and a sheathing layer of a material selected from the group consisting of fibre and foil, and wherein fibre thread is moistened with a binding agent, comprising the following steps:
reeling the moistened fibre thread onto a rotational plate comprising a number of holding means for fibre threads, to a blank bundle in a closed, approximately circular shape, comprising a layer of desired thickness of longitudinal, parallel fibres, whereby all longitudinal, parallel fibres in the layer achieve approximately equal axial tightening;
enveloping an outer layer of a material selected from the group consisting of fibre threads, foil/band and mixture thereof, around the layer of longitudinal fibres; and finishing the fabrication of the prepared blank in a second forming process, wherein said enveloping comprises winding on itself, an outer layer of a material selected from the group consisting of fibre threads, foil/band and mixture thereof, in a helical form around the layer of longitudinal fibres.

2. The method of claim 1, wherein the final forming of the reeled bundle is carried out by tightening in a jig to the required shape and by subsequent heating to the curing temperature of the binding agent.

3. The method of claim 2, wherein the finally formed blank can be divided in two or more parts.

4. The method of claims 1, wherein the fibre thread is selected from a group consisting of glass, basalt, carbon, and thermoplastic.

5. The method of claims 1, wherein thermoset plastic is used as a binding agent.

6. The method of claims 1, wherein thermoplastic is used as a binding agent.

7. A method for fabrication of a reinforcing blank from a composite material, wherein the reinforcing blank is fabricated of longitudinal fibres and a sheathing layer of a material selected from the group consisting of fibre and foil, and wherein fibre thread is moistened with a binding agent, comprising the following steps:
reeling the moistened fibre thread onto a rotational plate comprising a number of holding means for fibre threads, to a blank bundle in a closed, approximately circular shape, comprising a layer of desired thickness of longitudinal, parallel fibres, whereby all longitudinal, parallel fibres in the layer achieve approximately group axial tightening;
enveloping an outer layer of a material selected from the group consisting of fibre threads, foil/band and mixture thereof, around the layer of longitudinal fibres; and finishing the fabrication of the prepared blank in a second forming process, wherein said enveloping comprises knitting on itself, an outer layer of a material selected from the group consisting of fibre threads, foil/band and mixture thereof, around the layer of longitudinal threads.

8. The method of claim 7, wherein the final forming of the reeled bundle is carried out by tightening in a jig to the required shape and by subsequent heating to the curing temperature of the binding agent.

9. The method of claims 7, wherein the fibre thread is selected from a group consisting of glass, basalt, carbon, and thermoplastic.

10. The method of claims 7, wherein thermoset plastic is used as a binding agent.

11. The method of claims 7, wherein thermoplastic is used as a binding agent.

12. A device for reeling and winding of fibre thread for fabrication of a reinforcing blank from a composite material comprising:
a rotational plate comprising a number of holding means for fibre threads, where the holding means are arranged mutually spaced apart adjacent to the outer edge of the plate, for reeling of a blank with a closed, approximately circular shape, comprising a layer of desired thickness of longitudinal, parallel fibres, whereby all longitudinal, parallel fibres in the layer achieve approximately equal axial tightening, and at least one winding appliance arranged to wind a material selected from the group consisting of fibre threads, foil, and mixture thereof, in a helical form around the longitudinal fibre threads.

13. The device of claim 12, wherein the holding means consists of wheels comprising suitable grooves for the fibre threads.

14. The device of claim 12, wherein the device comprises at least one knitting appliance arranged to knit a material selected from the group consisting of fibre threads, foil, and mixture thereof around the longitudinal fibre threads.

15. The device of claim 12, wherein the device comprises a tightening appliance arranged to tighten and to regulate the supply of the fibre thread to the holding means of the rotational plate.

* * * * *